US012395419B2

(12) United States Patent
Mullis

(10) Patent No.: US 12,395,419 B2
(45) Date of Patent: Aug. 19, 2025

(54) PROGRAMMABLE NETWORK DETECTION OF NETWORK LOOPS

(71) Applicant: Schweitzer Engineering Laboratories, Inc., Pullman, WA (US)

(72) Inventor: Tristan Lloyd Mullis, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 479 days.

(21) Appl. No.: 18/161,165

(22) Filed: Jan. 30, 2023

(65) Prior Publication Data

US 2023/0344743 A1    Oct. 26, 2023

Related U.S. Application Data

(60) Provisional application No. 63/334,755, filed on Apr. 26, 2022.

(51) Int. Cl.
*H04L 12/00* (2006.01)
*H04L 43/50* (2022.01)
*H04L 45/18* (2022.01)

(52) U.S. Cl.
CPC ............. *H04L 43/50* (2013.01); *H04L 45/18* (2013.01)

(58) Field of Classification Search
CPC ..... H04L 43/50; H04L 45/18; H04L 41/0816; H04L 41/40; H04L 41/0873; H04L 41/122
USPC ........................................................ 370/242
See application file for complete search history.

(56) References Cited

U.S. PATENT DOCUMENTS

| 6,747,957 | B1 | 6/2004 | Pithawala |
| 7,218,632 | B1 | 5/2007 | Bechtolsheim |
| 7,376,831 | B2 | 5/2008 | Kollmyer |
| 7,872,983 | B2 | 1/2011 | Lai |
| 8,553,544 | B2 | 10/2013 | Lai |
| 8,800,044 | B2 | 8/2014 | Raad |
| 9,038,151 | B1 | 5/2015 | Chua |
| 9,237,129 | B2 | 1/2016 | Ling |
| 9,286,171 | B2 | 3/2016 | Cardona |

(Continued)

FOREIGN PATENT DOCUMENTS

| EP | 2765751 | 8/2014 |
| KR | 20150051107 | 5/2015 |

(Continued)

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Frantz Coby
(74) *Attorney, Agent, or Firm* — Justin K. Flanagan

(57) ABSTRACT

A device may include a loop detection subsystem to place a network flow on a first switch to forward any received open flow discovery protocol (OFDP) packets to the software-defined network (SDN) controller. The device may cause the first switch to egress a query OFDP packet out of a first port of the first switch. The device may detect that the first port on the first switch is attached to a network loop based on the same query OFDP packet being ingressed by the first port of the first switch. The device may implement a remedial action in response to the detected network loop.

21 Claims, 11 Drawing Sheets

(56) References Cited

U.S. PATENT DOCUMENTS

| | | |
|---|---|---|
| 9,432,255 B1 | 8/2016 | Hasan |
| 9,432,380 B2 | 8/2016 | Margalit |
| 9,680,588 B2 | 6/2017 | Connolly |
| 9,686,125 B2 | 6/2017 | Smith |
| 9,769,060 B2 | 9/2017 | Dearien |
| 11,165,685 B2 | 11/2021 | Mullis |
| 11,228,521 B2 | 1/2022 | Mullis |
| 2002/0172157 A1 | 11/2002 | Rhodes |
| 2003/0112821 A1 | 6/2003 | Cleveland |
| 2003/0125924 A1 | 7/2003 | Lines |
| 2003/0133443 A1 | 7/2003 | Klinker |
| 2003/0188159 A1 | 10/2003 | Josset |
| 2005/0025141 A1 | 2/2005 | Chao |
| 2005/0078672 A1 | 4/2005 | Caliskan |
| 2005/0192008 A1 | 9/2005 | Desai |
| 2007/0133395 A1 | 6/2007 | Herring |
| 2008/0005558 A1 | 1/2008 | Hadley |
| 2008/0080384 A1 | 4/2008 | Atkins |
| 2009/0257743 A1 | 10/2009 | Chung |
| 2009/0285093 A1 | 11/2009 | Bolt |
| 2009/0313189 A1 | 12/2009 | Sun |
| 2010/0241608 A1 | 9/2010 | Huang |
| 2011/0085567 A1 | 4/2011 | Beecroft |
| 2011/0087952 A1 | 4/2011 | Marin |
| 2011/0280145 A1* | 11/2011 | Itoh ................... H04L 12/4625 370/252 |
| 2013/0077477 A1 | 3/2013 | Daraiseh |
| 2013/0108259 A1 | 5/2013 | Srinivas |
| 2013/0159865 A1 | 6/2013 | Smith |
| 2013/0176889 A1* | 7/2013 | Ogawa ................... H04L 12/12 370/252 |
| 2013/0212285 A1 | 8/2013 | Hoffmann |
| 2013/0250770 A1 | 9/2013 | Zou |
| 2013/0263247 A1 | 10/2013 | Jungck |
| 2013/0294228 A1 | 11/2013 | Ahuja |
| 2013/0339955 A1 | 12/2013 | Prawer |
| 2014/0025945 A1 | 1/2014 | McGrew |
| 2014/0029451 A1 | 1/2014 | Nguyen |
| 2014/0064100 A1 | 3/2014 | Edwards |
| 2014/0112130 A1 | 4/2014 | Yang |
| 2014/0115706 A1 | 4/2014 | Silva |
| 2014/0129700 A1 | 5/2014 | Mehta |
| 2014/0153572 A1 | 6/2014 | Hampel |
| 2014/0160939 A1 | 6/2014 | Arad |
| 2014/0226467 A1 | 8/2014 | Park |
| 2014/0241345 A1 | 8/2014 | DeCusatis |
| 2014/0245387 A1 | 8/2014 | Colpo |
| 2014/0280834 A1 | 9/2014 | Medved |
| 2014/0325038 A1 | 10/2014 | Kis |
| 2014/0325649 A1 | 10/2014 | Zhang |
| 2014/0371941 A1 | 12/2014 | Keller |
| 2014/0376406 A1 | 12/2014 | Kim |
| 2015/0081762 A1 | 3/2015 | Mason |
| 2015/0112933 A1 | 4/2015 | Satapathy |
| 2015/0172222 A1 | 6/2015 | Liao |
| 2015/0195190 A1 | 7/2015 | Shah Heydari |
| 2015/0312658 A1 | 10/2015 | Winzer |
| 2015/0363522 A1 | 12/2015 | Maurya |
| 2016/0043996 A1 | 2/2016 | Syed Mohamed |
| 2016/0119299 A1 | 4/2016 | Amulothu |
| 2016/0142427 A1 | 5/2016 | de los Reys |
| 2016/0165454 A1 | 6/2016 | Li |
| 2016/0330076 A1 | 11/2016 | Tiwari |
| 2016/0337247 A1 | 11/2016 | Yao |
| 2016/0344592 A1 | 11/2016 | Cook |
| 2017/0026225 A1 | 1/2017 | Smith |
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1 | 1/2017 | Smith |
| 2017/0026292 A1 | 1/2017 | Smith |
| 2017/0026349 A1 | 1/2017 | Smith |
| 2017/0118066 A1 | 4/2017 | Mathew |
| 2017/0317780 A1 | 11/2017 | Wood |
| 2019/0116053 A1 | 4/2019 | Allan |
| 2019/0273717 A1 | 9/2019 | Dearien |
| 2019/0334808 A1 | 10/2019 | Nandy |

FOREIGN PATENT DOCUMENTS

| | | | |
|---|---|---|---|
| WO | 2015038040 | 3/2015 | |
| WO | WO-2017118875 A1 * | 7/2017 | ............. G06F 21/64 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

* cited by examiner

PROGRAMMABLE NETWORK DETECTION OF NETWORK LOOPS

RELATED APPLICATIONS

This application claims priority to U.S. Provisional Patent Application No. 63/334,755 filed on Apr. 26, 2022, titled "Programmable Network Detection of Network Loops," which application is hereby incorporated by reference in its entirety.

TECHNICAL FIELD

This disclosure relates to network loop detection. This disclosure also relates to software-defined network (SDN) architectures, processors, memory, network interfaces, computer-executable instructions, electrical infrastructure, and the like.

BRIEF DESCRIPTION OF THE DRAWINGS

Non-limiting and non-exhaustive examples of the disclosure are described with reference to the figures described below.

DETAILED DESCRIPTION

Figure 1:
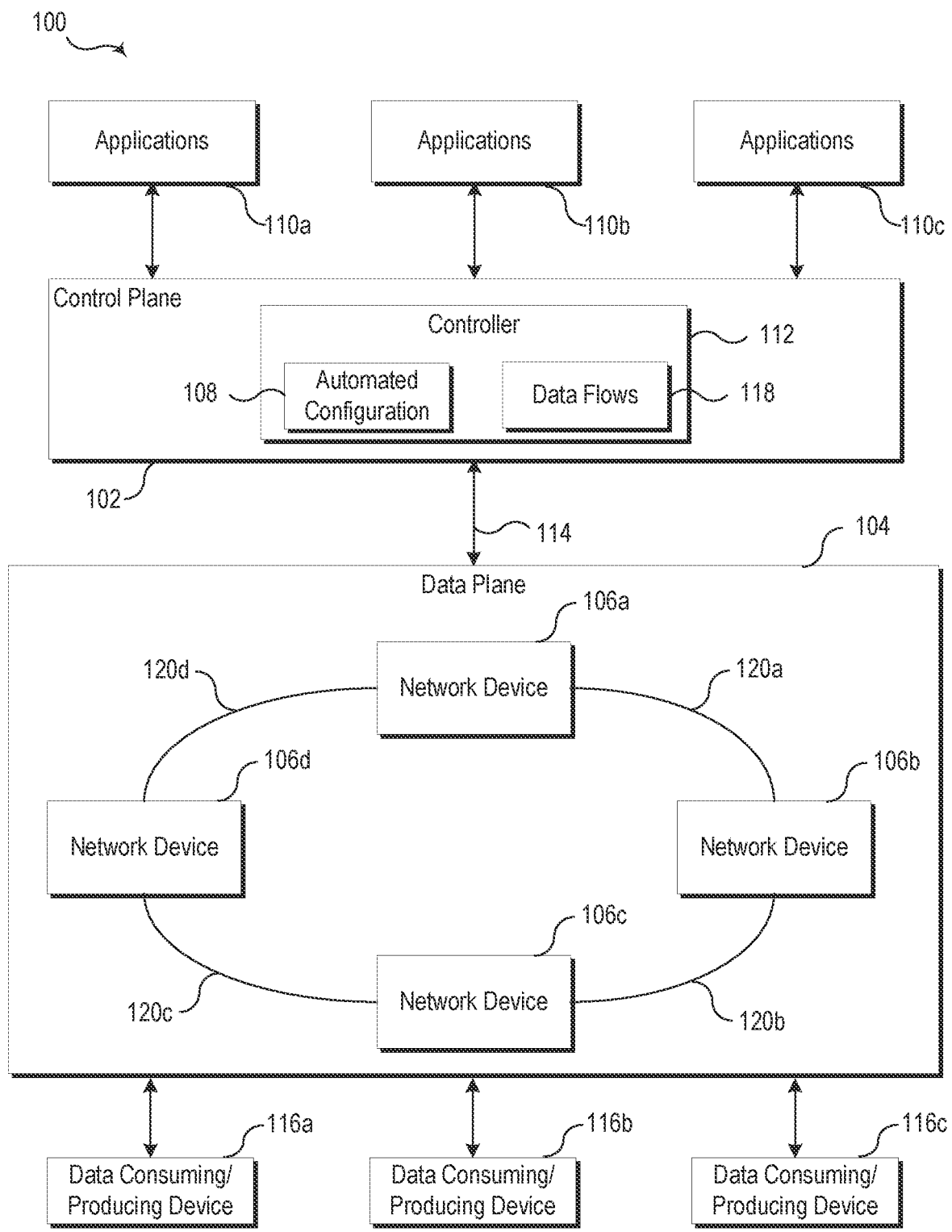
FIG. 1 illustrates a conceptual representation of a software-defined network (SDN) system including a control plane, a data plane, and a plurality of data consumer/producer devices, according to one embodiment.

Communication networks (such as operational technology (OT) networks) may utilize a variety of technologies, including software-defined network (SDN) networking technologies. In an SDN, a controller may regulate communications on the network. SDN networking technologies offer a variety of advantages, such as deny-by-default security, latency guarantees, deterministic transport capabilities, redundancy, fail-over planning, etc. An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to optimize the usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network-discovered data path with an application-desired data path may be a challenging task involving changing configurations in many devices. To compound this problem, the management interfaces and feature sets used on many devices are not standardized. Further, network administrators often need to reconfigure the network to avoid loops, gain route convergence speed, and prioritize certain classes of applications.

Significant complexity in managing a traditional network in the context of an OT network arises from the fact that each network device (e.g., a switch or router) includes both control logic and data forwarding logic. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in a switching fabric (network device), and as a consequence, changing the forwarding behavior of a network involves changing the configurations of many (potentially all) network devices.

In contrast, in an SDN, a controller embodies the control plane and determines how packets (or frames) should flow (or be forwarded) in the network. The controller communicates this information to the network devices, which constitute the data plane. The controller may set forwarding tables in network devices that establish how data is to be routed. This enables centralized configuration and management of a network. In addition to simplifying the management of a network, an SDN architecture may also enable monitoring and troubleshooting features that may be beneficial for use in OT networks. Such features may include, but are not limited to, mirroring a data-selected flow rather than mirroring a whole port; alarming on bandwidth when a communication channel gets close to saturation; providing metrics (e.g., counters and meters for quality of service, packet counts, errors, drops, or overruns, etc.) for a specified flow; and permitting the monitoring of specified applications rather than monitoring based on virtual local area networks (VLAN) or media access control (MAC) addresses.

Configuration of an SDN may be challenging because each communication flow between hosts must be configured or the traffic between the hosts may be blocked due to the deny-by-default security policy. The inventors of the present application have recognized that portions of the configuration of an SDN may be automated in various ways consistent with the present disclosure to reduce the configuration burden. In various embodiments, an SDN controller may be configured to detect network loops. Further, various embodiments may include an SDN controller that, upon detection of a network loop, takes steps to avoid or eliminate traffic on the network loop.

In some aspects, the techniques described herein relate to an SDN controller that includes a loop detection subsystem. The loop detection subsystem operates to place a network flow on a first switch to forward any received open flow discovery protocol (OFDP) packets to the SDN controller and cause the first switch to egress a query OFDP packet out of a first port of the first switch. The loop detection subsystem detects that the first port on the first switch is attached to a network loop based on the query OFDP packet being ingressed by the first port of the first switch. In response, the SDN controller implements a remedial action to address the detected network loop.

The remedial action implemented by the loop detection subsystem may include the transmission of a notification indicating the existence of a network loop and/or disabling the first port on the first switch. The query OFDP packet may be initially egressed in response to a link-up event detected by the first port of the first switch. That is, the SDN controller may operate to detect a network loop by, in part, generating a query OFDP packet each time a link-up event is detected on each port of each switch within the network. Accordingly, the SDN controller may operate to evaluate each new connection to determine if a loop has been created. The identification of a loop may result in the port being disabled to break the network loop and/or a warning being provided.

In some instances, the SDN controller may cause a query OFDP packet to be egressed on a periodic basis, such as at the expiration of an automatically resetting timer. For example, the SDN controller may evaluate one or more ports on one or more switches within the network every few seconds, minutes, hours, etc.

In some instances, the SDN controller may cause a query OFDP packet to be egressed in response to a traffic monitoring subsystem detecting an increase in network traffic that exceeds a threshold level. In such embodiments, unexpected or abnormal increases in network traffic may prompt the SDN controller to test for network loops on one or more ports of one or more network switches.

In some implementations, the SDN controller is used only during the commissioning or setup of a network. As described above, the SDN controller may be used to configure the network switches and other devices in the network. After commissioning, the SDN controller may be removed from the network or otherwise disabled from operation. In such embodiments, the loop detection and remediation techniques, systems, and methods described herein are used during commissioning and then disabled or no longer implemented during the post-commissioning or production phase of the network operation. Explicit disabling of the loop detection approaches described herein may be used to prevent malicious attackers from using OFDP packets to disable ports or switches within an operational network. In some embodiments, switches may be configured to explicitly ignore OFDP packets during a post-commissioning phase (e.g., during a production or normal operational phase).

In other embodiments, the SDN controller may cause one or more switches or other computing devices within the network to continue to implement the loop detection and remediation approaches described herein. For example, the SDN controller may program the first switch to implement the functions of the loop detection subsystem after commissioning, such that loop detection continues to be implemented after the SDN controller is disconnected during production.

The presently described systems and methods can be used to create or operate a communications network that includes a data network to convey data communications between computing devices, one or more switches, and an SDN controller (at least during commissioning, setup, or maintenance). The SDN controller may include an OFDP packet generation subsystem, a loop detection subsystem, and a remediation subsystem. In some embodiments, the SDN controller may further include an OFDP authentication subsystem, as described herein. The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules. As used herein, a software module may include any type of computer instruction or computer-executable code located within a memory device that is operable in conjunction with appropriate hardware to implement the programmed instructions. A software module may, for instance, comprise one or more physical or logical blocks of computer instructions, which may be organized as a routine, program, object, component, data structure, etc., that performs one or more tasks or implements particular data types.

Embodiments may be provided as a computer program product including a non-transitory machine-readable medium having stored thereon instructions that may be used to program a computer or other electronic device to perform processes described herein. The non-transitory machine-readable medium may include but is not limited to, hard drives, ROMs, RAMs, EPROMs, EEPROMs, solid-state memory devices, or other types of machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific integrated circuit (ASIC), a programmable logic device (PLD), a field programmable gate array (FPGA), or another customizable or programmable device.

FIG. 1 illustrates a conceptual representation of a software-defined network (SDN) system 100 including a control plane 102, a data plane 104, and a plurality of data consumer/producer devices 116a-116c consistent with embodiments of the present disclosure. The control plane 102 directs the flow of data through the data plane 104. More specifically, an SDN controller 112 may communicate with a plurality of network devices 106a-106d via an interface 114 to communicate data flows 118 that are implemented by each network device 106a-106d. The controller 112 may specify rules for routing traffic through the data plane 104 based on a variety of criteria.

Each network device 106a-106d may store a plurality of data flows used to route traffic. In one specific embodiment, the data flows may be stored in or implemented by a Field Programmable Gate Array (FPGA). An FPGA may be a logical choice for use in network devices because FPGAs may provide both the configurability and speed suitable for SDN applications. The data flows may be received from the controller 112. Corruption of the data flows may result in data packets being misdirected or dropped. Misdirecting or dropping data packets may result in the maloperation of equipment that utilizes information in the misdirected or dropped data packets.

As illustrated, the data plane 104 includes a plurality of network devices 106a-106d in communication with one another via a plurality of physical links 120a-120d. In various embodiments, the network devices 106a-106d may be embodied as switches, multiplexers, and other types of network devices. The physical links 120a-120d may be embodied as Ethernet, fiber optic, and other forms of data communication channels. As illustrated, the physical links 120a-120d between the network devices 106a-106d may provide redundant connections such that a failure of one of the physical links 120a-120d is incapable of completely blocking communication with an affected network device. In some embodiments, the physical links 120a-120d may provide an N-1 redundancy or better.

The data consuming/producing devices 116a-116c may represent a variety of devices that produce or consume data within an electric power transmission and distribution system. For example, data-consuming/producing devices 116a-116c may be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 104 using a plurality of data flows implemented by the controller 112. The data consuming/producing devices 116a-116c may be embodied by a wide range of devices consistent with embodiments of the present disclosure.

Applications 110a-110c represent a variety of applications operating in an application plane. The controller 112 may expose an application programming interface (API) that the applications 110a-110c can use to configure the data plane 104. In this scenario, the controller 112 may act as an interface to the data plane 104 while the control logic resides in the applications 110a-110c. The configuration of the controller 112 and applications 110a-110c may be tailored to meet a wide variety of specific needs.

The controller 112 may support automated configuration 108 based on approved services, parameters, and data metrics. Upon detection of a communication associated with an approved service and parameters, the controller 112 may generate corresponding data flow(s) 118. In some embodiments, the automated configuration 108 may occur during a commissioning phase, while in other embodiments, an automated configuration 108 may be ongoing while system 100 is in operation.

OFDP is a derivative of Link Layer Discovery Protocol (LLDP) that uses a different destination multicast MAC (media access control) address. The different MAC address ensures the packets are forwarded past traditional switches that would otherwise drop LLDP packets so true links between programmable switches can be discovered.

Figure 2A:
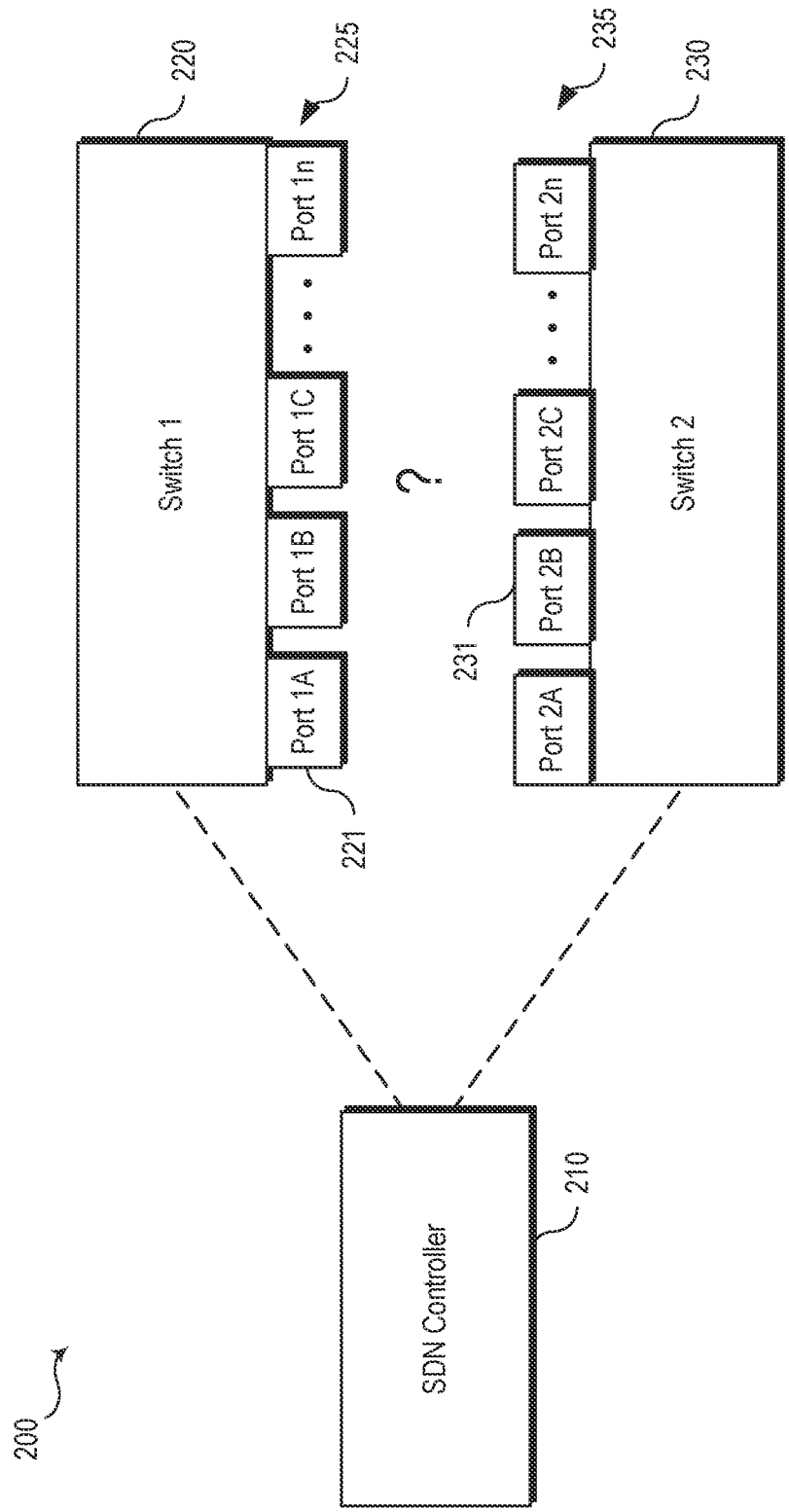
FIG. 2A illustrates a block diagram of an SDN architecture that includes an SDN controller and two switches, according to one embodiment.

FIG. 2A illustrates a block diagram of an SDN architecture 200 that includes an SDN controller 210, a first network switch 220, and a second network switch 230, according to one embodiment. During the commissioning phase of the network, the SDN controller 210 may not know about links between ports 225 of the first network switch 220 and ports 235 of the second network switch 230.

Figure 2B:
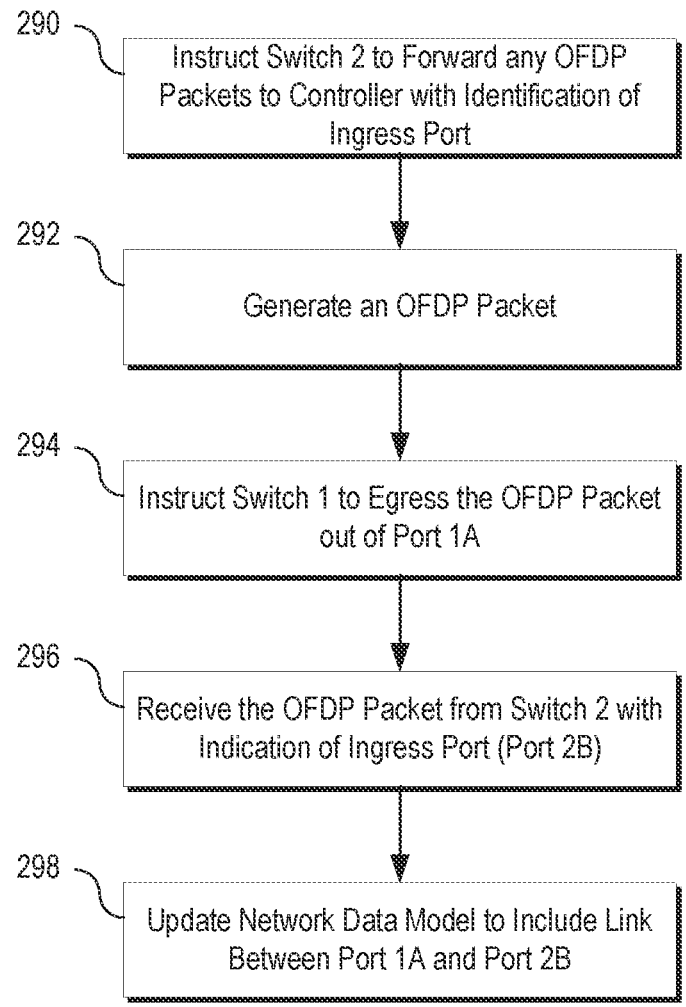
FIG. 2B illustrates a flow chart of an example method for determining a network model using open flow discovery protocol (OFDP) packets, according to one embodiment.

FIG. 2B illustrates a flow chart of an example method for determining a network model using OFDP packets, according to one embodiment. For example, the illustrated method can be used to identify a link between one of the ports 225 of the first network switch 220 and one of the ports 235 of the second network switch 230 in the SDN architecture 200 of FIG. 2A.

As illustrated, the SDN controller 210 instructs, at 290, the second network switch 230 to forward any OFDP packets to the SDN controller 210 along with identification of which port ingressed the packet. The SDN controller 210 may generate (e.g., generate itself or cause the first network switch 220 to generate) an OFDP packet, at 292. The SDN controller 210 may instruct, at 294, the first network switch 220 to egress the OFDP packet out of port 1A 221.

In the event that a connection exists between port 1A 221 of the first network switch 220 and port 2B 231 of the second network switch 230, the second network switch 230 will forward, at 296, the OFDP packet to the SDN controller 210 with an indication that the packet was ingressed in port 2B 231. The SDN controller 210 updates the network data model, at 298, to include the link between port 1A 221 of the first network switch 220 and port 2B 231 of the second network switch 230.

Figure 2C:
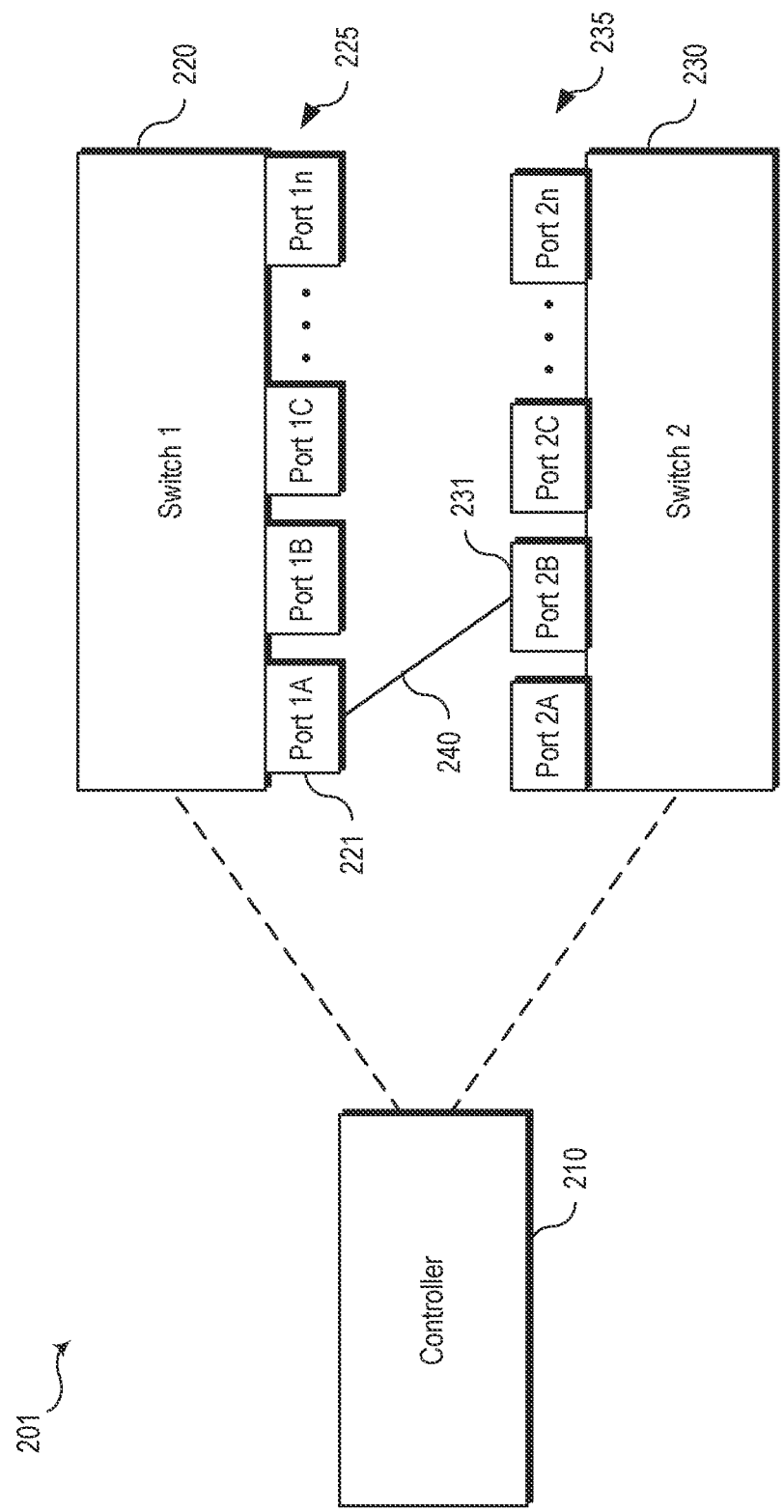
FIG. 2C illustrates an updated network model of the SDN architecture in FIG. 2A based on a detected link, according to one embodiment.

FIG. 2C illustrates an updated network model of the SDN architecture 201 in FIG. 2A based on a detected link 240 between port 1A 221 of the first network switch 220 and port 2B 231 of the second network switch 230, according to one embodiment. OFDP packets are used by SDN controllers, as described above, to discover links between devices in a communications network.

Network loops are a problem that frequently occurs in traditional switch networks, sometimes resulting in what is referred to as a broadcast storm. A broadcast storm is where all multicast and broadcast packets (e.g., ethernet frames) are repeatedly replicated within the network. Broadcast storms consume bandwidth on the network and can even result in degradation to the point that the network is rendered nonfunctional. Network loops can also appear in SDN networks, but they are often isolated to only one specific traffic type or a subset of specific traffic types, which makes the network loops much harder to detect.

Figure 3A:
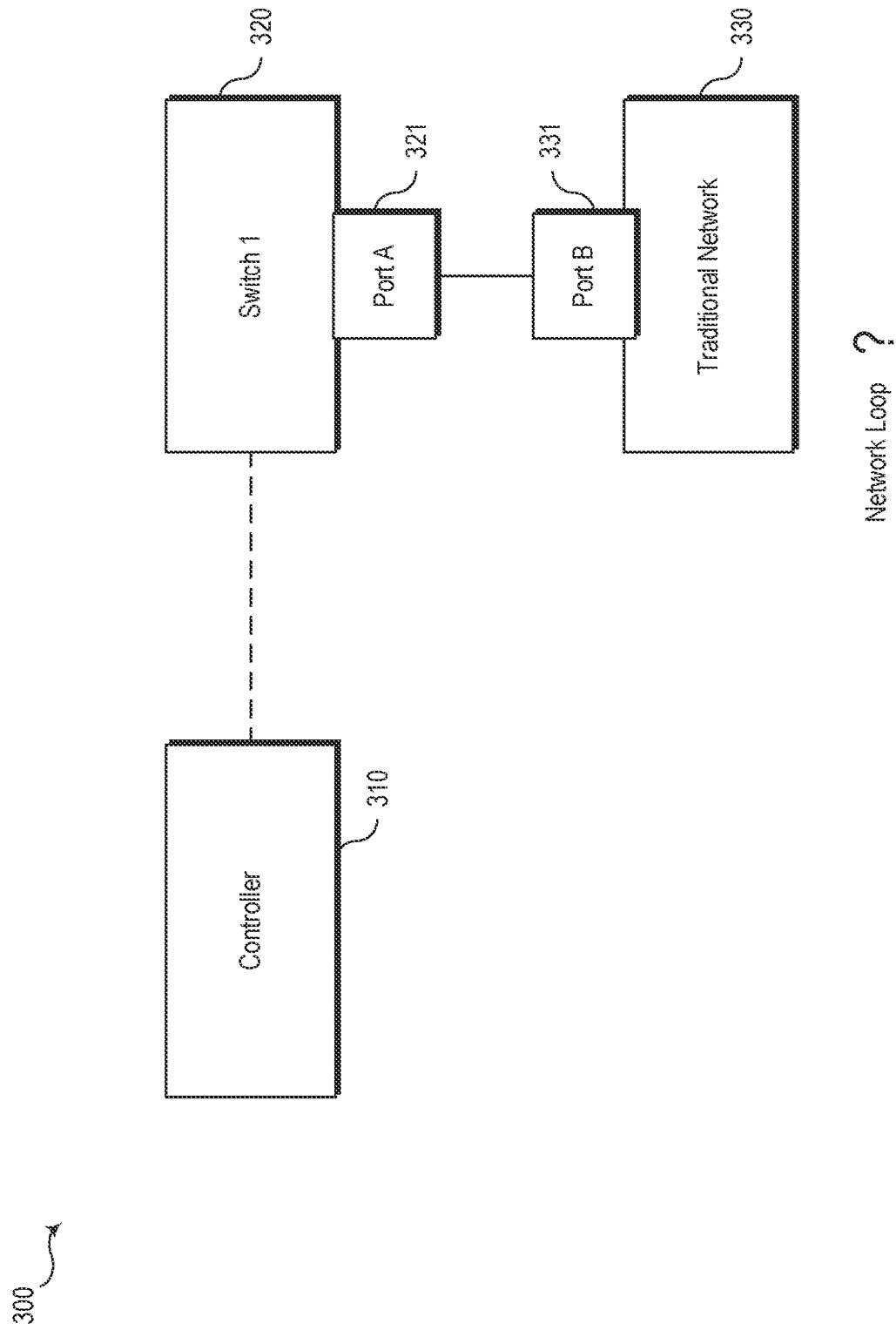
FIG. 3A illustrates another block diagram of an SDN architecture that includes an SDN controller, a switch, and a traditional network, according to one embodiment.

FIG. 3A illustrates another block diagram of an SDN architecture 300 that includes a controller 310, a switch 320, and a traditional network 330, according to one embodiment. The controller 310 leverages components, protocols, and packet types relating to OFDP link discovery to identify and remediate network loops.

As illustrated, the controller 310 manages the switch 320, which is connected via port A 321 to port B 331 of the traditional (e.g., unmanaged) network 330 that may include any number of network and/or computing devices. One or more network loops may exist in the traditional network 330. For example, a network loop may be accidentally created by the simple connection of a cable between two ports of the same unmanaged switch. In such a situation, port A 321 of the switch 320 managed by the controller 310 is connected to the network loop. The SDN architecture 300 may include any number of other managed switches and network connections that are not connected to the network loop. In fact, the switch 320 may even be connected to other ports within the traditional network 330 that are not part of the network loop. The controller 310 may be configured to detect the network loop and disable the port connected to the network loop without disabling or disrupting other connections and ports within the network.

Figure 3B:
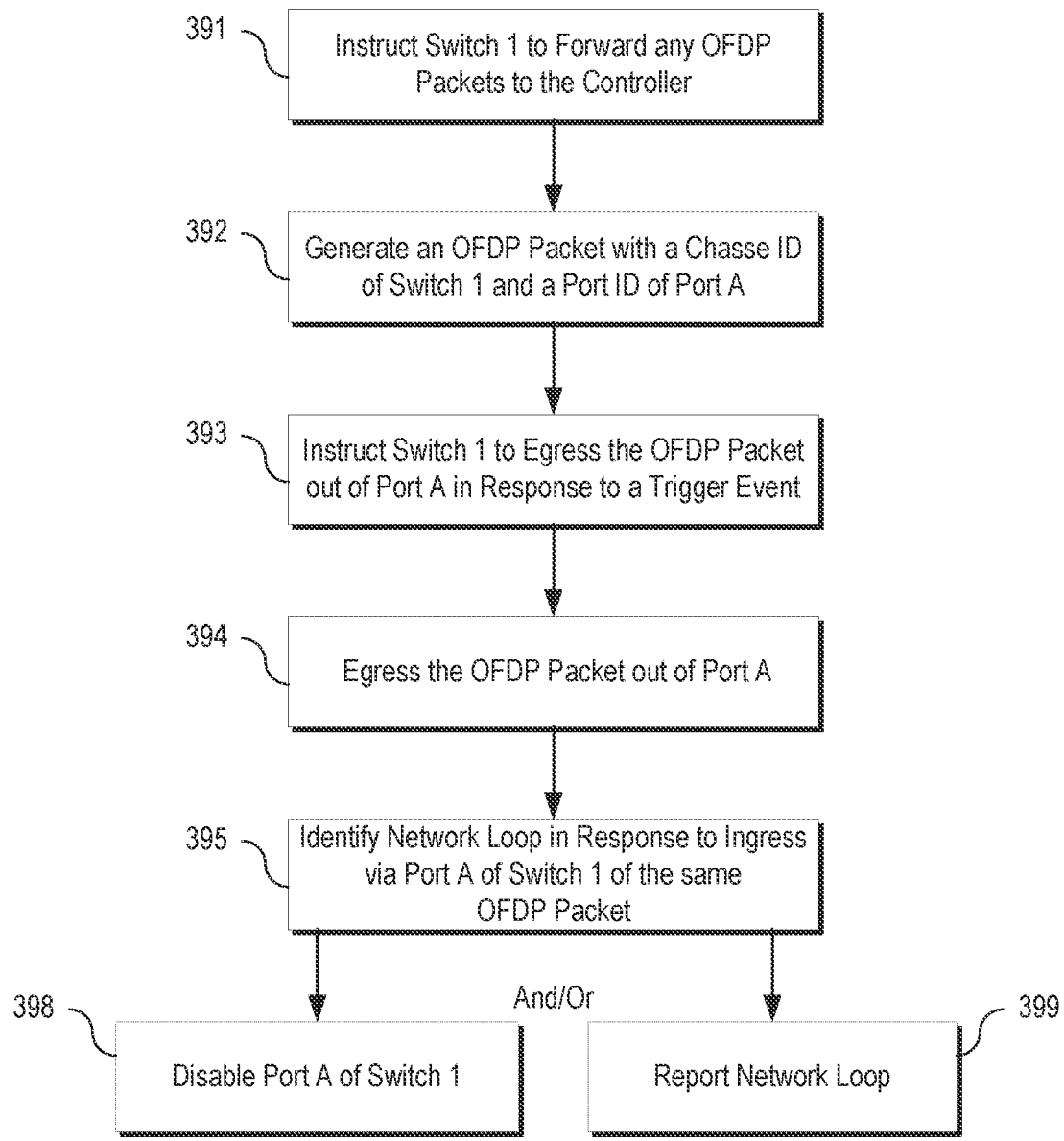
FIG. 3B illustrates a flow chart of an example method to detect and remediate a network loop, according to one embodiment.

FIG. 3B illustrates a flow chart of an example method to detect and remediate a network loop in the SDN architecture 300 of FIG. 3A, according to one embodiment. The controller 310 may instruct (e.g., program or place a network flow on) the switch 320 to cause the switch 320 to forward any OFDP packets it receives to the controller 310, at 391. The controller 310 may generate, at 392, or cause the switch 320 to generate, a query OFDP packet with a chasse ID of the switch 320 and a port ID of port A 321. The OFDP packet is referred to as a "query" OFDP packet in that it is used as part of the inquiry to discover network loops. The query OFDP packet may be implemented according to the OFDP subset of the LLDP.

The controller 310 instructs, at 393, the switch 320 to egress the query OFDP packet out of port A 321 in response to a trigger event. The trigger event may be, for example, a timer expiration, detection of a link-up event when a cable is plugged into a port, detection of an abnormal increase in network traffic (e.g., network traffic is detected above a threshold level or detected as increases above a threshold rate of increase). The switch 320 egresses the query OFDP packet out of port A 321, at 394. The controller 310 detects that a network loop exists based on the same query OFDP packet being ingressed via port A 321 of the switch 320, at 395. Accordingly, the controller 310 detects the network loop because the query OFDP packet is egressed out of port A 321 and returns to port A 321 for ingress after a short period of time.

In many instances, the network loop may result in the query packet being ingressed many dozens of times in a very short period of time. Each detected event may indicate a network loop. A notification subsystem of the controller 310 may consolidate the events into a single notification to report, at 399, the existence of the network loop and/or report that port A 321 of the switch 320 has been disabled, at 398, or otherwise communicatively disconnected from the port B 331 of the traditional network 330.

Figure 3C:
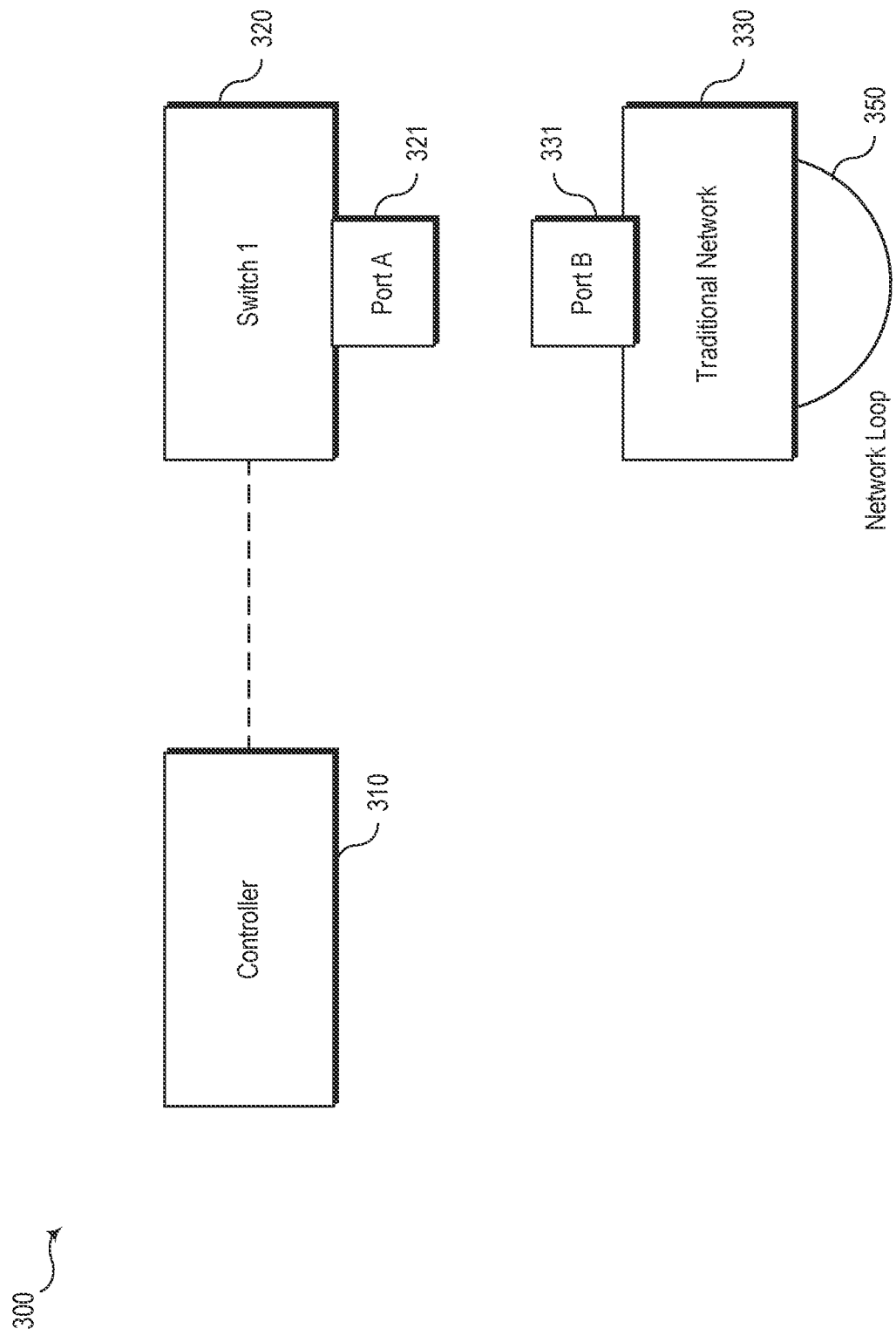
FIG. 3C illustrates the detection of a network loop that includes port A of the first switch, according to one embodiment.

FIG. 3C illustrates the detection of a network loop 350 that includes port A 321 of the switch 320, according to one embodiment. The link between port A 321 and port B 331 is severed to preserve the integrity and functionality of other connections in the network (not shown) and/or otherwise eliminate the continuous replication of broadcast and multicast frames. Severing the link between port A 321 and port B 331 does not fix or remove the network loop 350 in the traditional network 330. Rather, severing the link prevents the broadcast storm within the network.

Figure 4A:
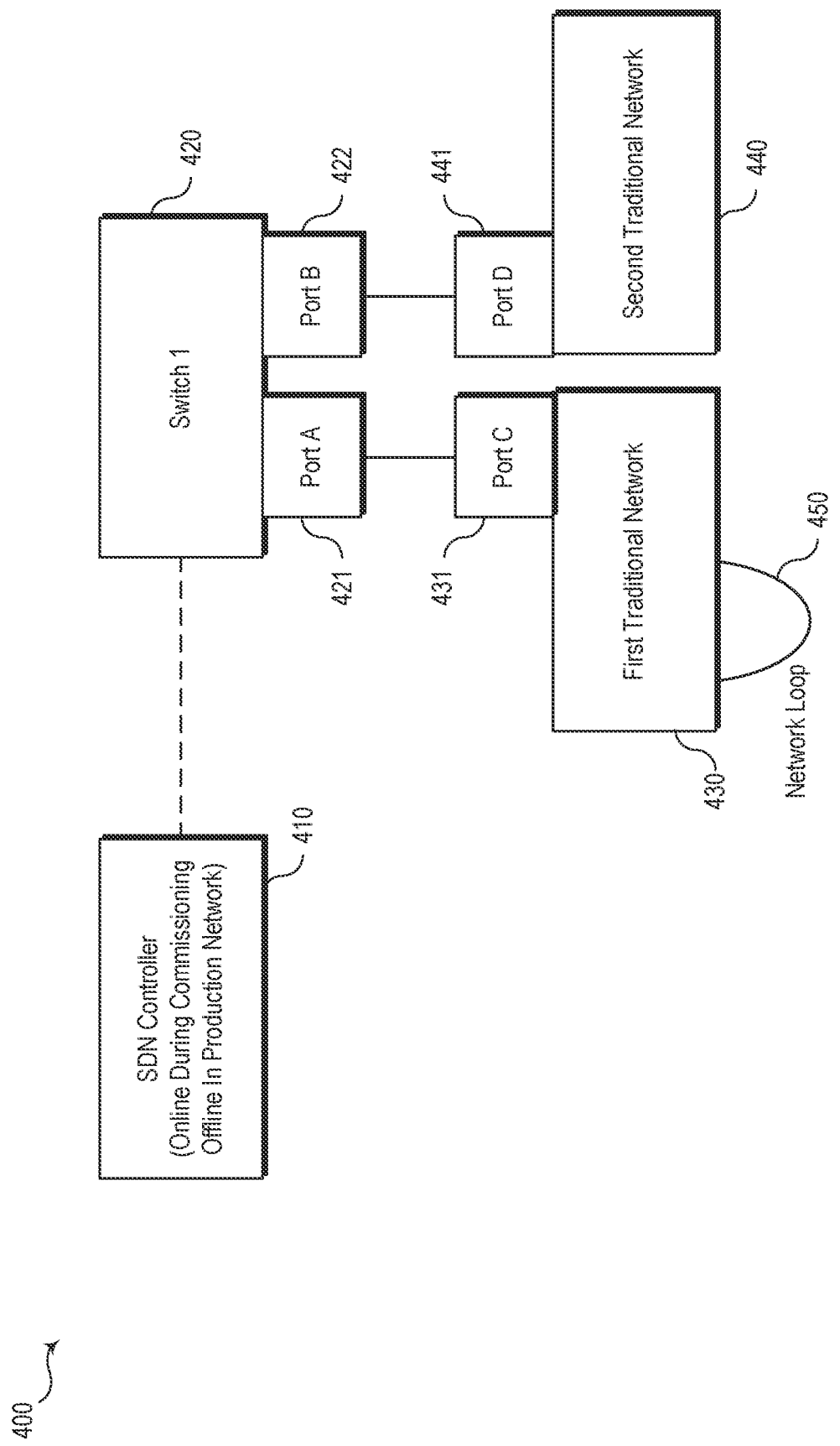
FIG. 4A illustrates an SDN controller used during commissioning to detect network loops, where the SDN controller is removed or placed offline during post-commissioning operation, according to one embodiment.

FIG. 4A illustrates an SDN controller 410 used during the commissioning of an SDN network 400 to detect a network loop 450, where the SDN controller 410 is removed or placed offline during post-commissioning operation, according to one embodiment. In the illustrated embodiment, a switch 420 includes port A 421 and port B 422. Port A 421 of the switch 420 provides a link to components within a first traditional network 430 via port C 432. Port B 422 of the switch 420 provides a link to components within the second traditional network 440. The first traditional network 430 is independent from the second traditional network 440.

The first traditional network 430 is illustrated with a network loop 450. Utilizing the systems and methods described herein, including the method illustrated in FIG. 3B, the SDN controller 410 may generate OFDP packets to query the functionality of port B 422 to discover that no network loops are present in the second traditional network 440. The SDN controller 410 may generate OFDP packets to query the functionality of port A 421 and discover that the network loop 450 results in the query OFDP packet being returned to port A 421 after going through the network loop 450 in the first traditional network. As described herein, the SDN controller 410 may remediate the problem by disconnecting or disabling port A 421 during the commissioning of the SDN network 400 so as to eliminate the network loop 450 from impacting the performance of the SDN network 400, or at least the programmable portions of the SDN network 400. The SDN network 400 can be placed into production and the SDN controller 410 can be removed with port A 421 disabled.

Figure 4B:
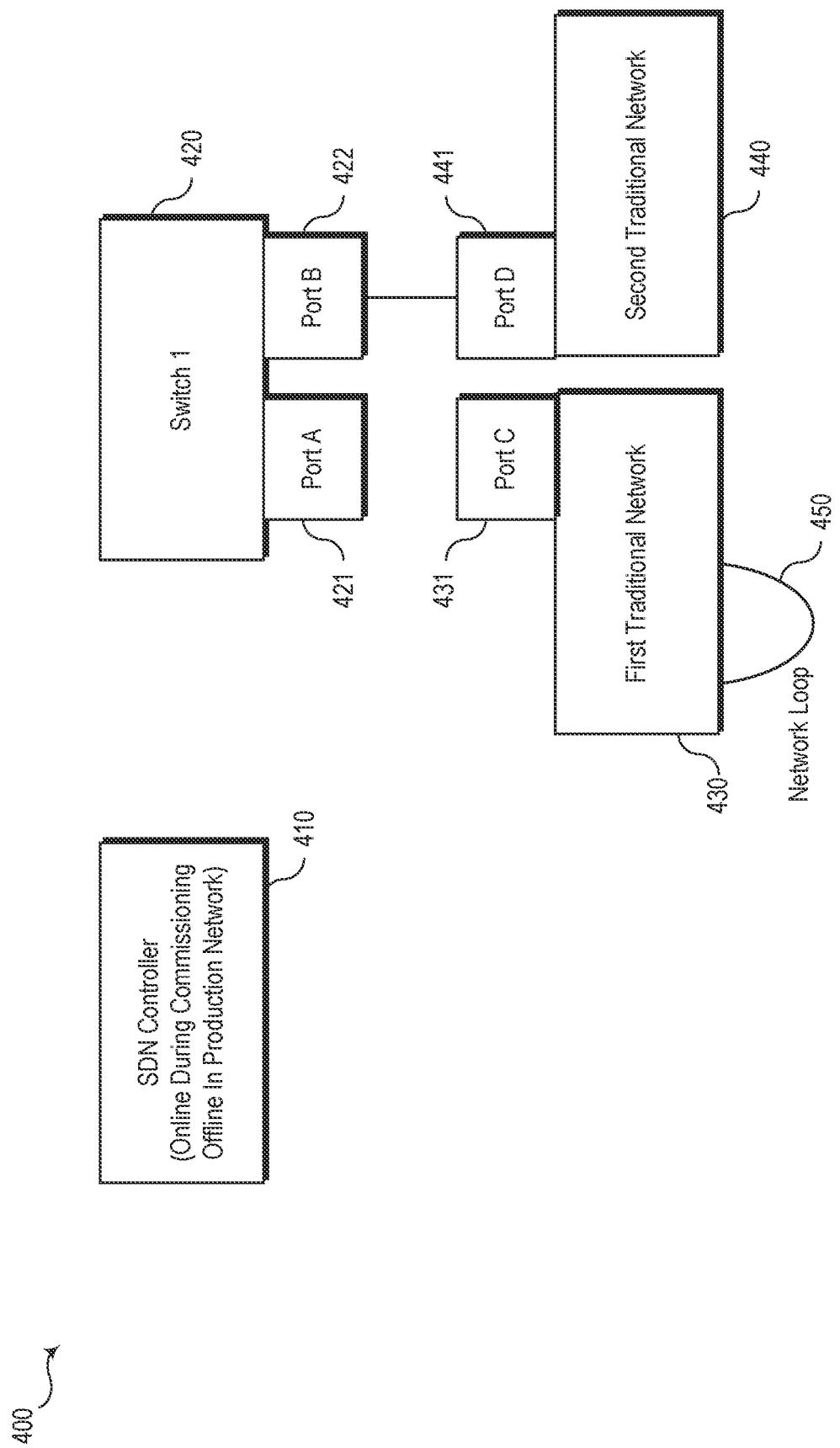
FIG. 4B illustrates the SDN controller offline and disconnected with port A of the first network switch disabled to eliminate a previously detected network loop, according to one embodiment.

FIG. 4B illustrates the SDN controller 410 offline and disconnected with port A 421 of the network switch 420 disabled to eliminate a previously detected network loop in the first traditional network 430, according to one embodiment. The SDN-managed switch 420 maintains a link between port B 422 and port D 433 of the second traditional network 440 since this link was not impacted by the detected network loop 450 in the first traditional network 430. Similarly, any other SDN-managed switches (not shown) and other components (not shown) in the SDN network 400 may be unaffected by the disabled port A 421, such that most of the SDN network 400 is able to function without interruption.

Figure 5:
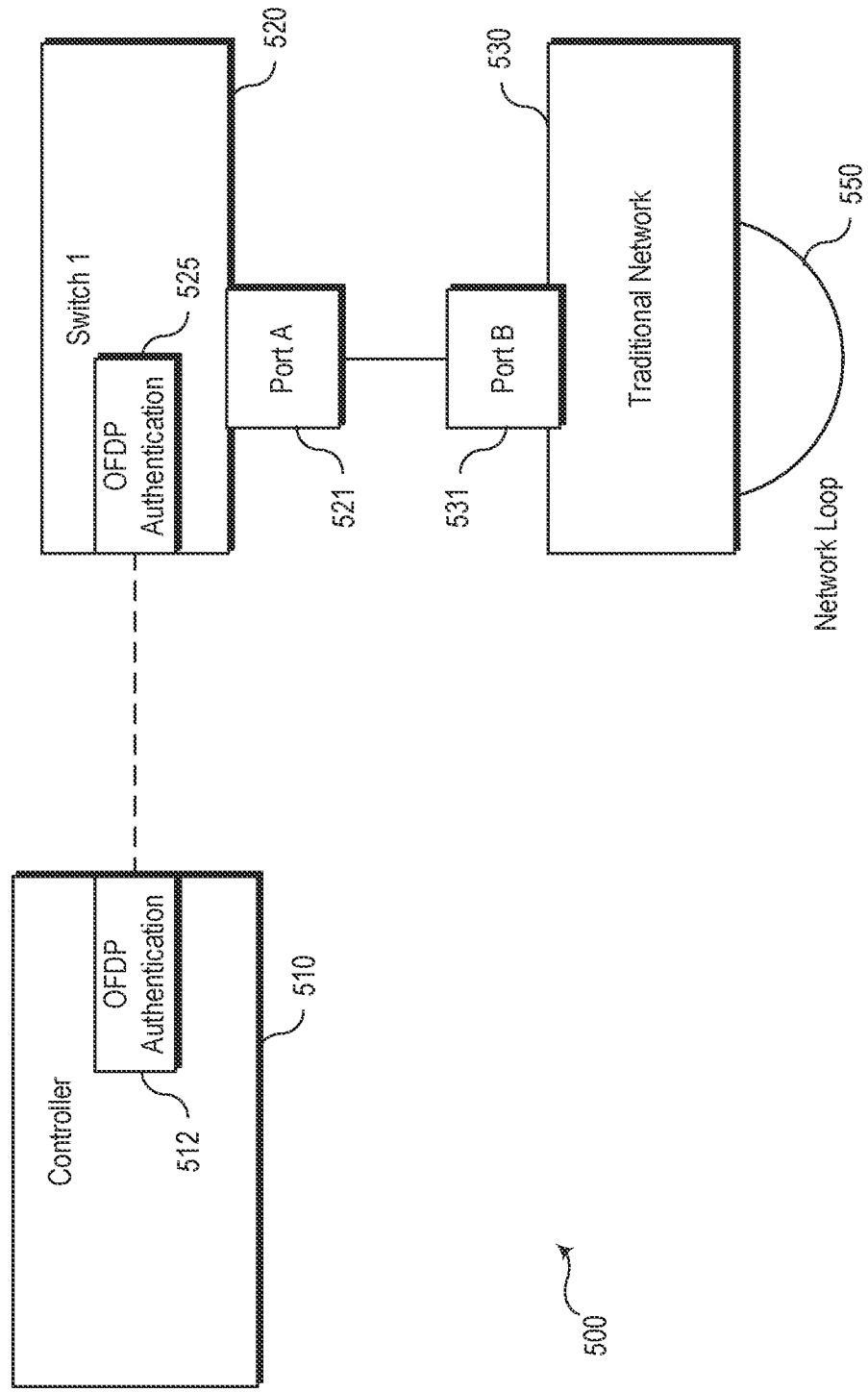
FIG. 5 illustrates a network architecture with an SDN controller that implements an OFDP authentication protocol, according to one embodiment.

FIG. 5 illustrates a network architecture 500 with an SDN controller 510 that implements an OFDP authentication protocol, according to one embodiment. As illustrated, the SDN controller 510 may include an OFDP authentication module 512 that facilitates the authentication of OFDP packets. A switch 520 may include a corresponding OFDP authentication module 525 to authenticate OFDP packets received from the controller 510. For example, the controller 510 may add or otherwise utilize a cryptographic hash to prove that the controller 510 is the source of a given OFDP packet. The switch 520 may process the first instance of the OFDP packet to validate its legitimacy. Once validated, the OFDP packet may be transmitted within the SDN network and, if a network loop 550 is present, be returned to the switch 520 via the link between port A 521 and port B 531 of a traditional network 530.

As in previous embodiments, the detected network loop 550 may result in a notification or disabling of the link between port A 521 and port B 531. The cryptographic hash, or alternative authentication schema, ensures that malicious attacks cannot be implemented in which fake OFDP packets are generated to erroneously indicate the existence of network loops, which might result in ports being disabled even though no actual network loop exists.

Figure 6:
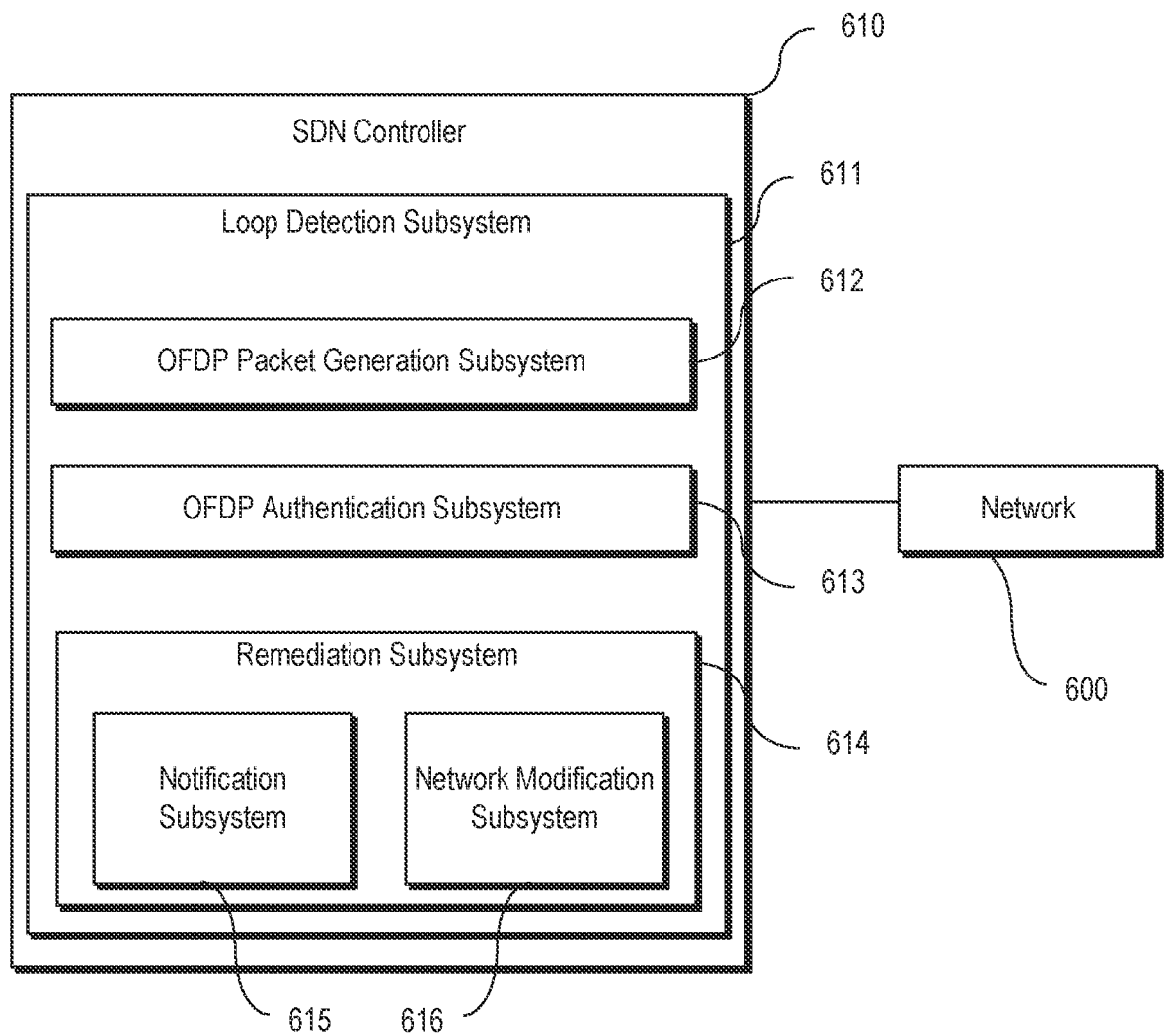
FIG. 6 illustrates an SDN controller with a loop detection subsystem to detect a ring network loop formed between three network switches, according to one embodiment.

FIG. 6 illustrates an SDN controller 610 of an SDN network 600 with a loop detection subsystem 611 to detect a network loop, as described herein. The SDN controller 610 detects a network loop and remediates the SDN network by disabling one or more ports or connections within the network 600 to prevent continuous replication or circulation of broadcast and multicast frames within the network 600.

The SDN network controller 610 includes the loop detection subsystem 611 to detect and remediate the network loop. As illustrated, the loop detection subsystem 611 includes an OFDP packet generation subsystem 612, an OFDP authentication subsystem 613, and a remediation subsystem 614. The remediation subsystem 614 includes a notification subsystem 615 and/or a network modification subsystem 616.

The OFDP packet generation subsystem 612 may operate to generate a query OFDP packet to cause a network switch 620 to egress the query OFDP packet out of port. The loop detection subsystem 611 may place a network flow on a network switch within the network 600 to cause the network switch to forward any received OFDP packets to the SDN controller 610 with information identifying the ingress port.

The OFDP authentication subsystem 613 facilitates the authentication of OFDP packets by, for example, adding a cryptographic hash to all OFDP packets. Network switches within the network 600 can use the cryptographic hash of each received OFDP packet to confirm or validate authenticity. The loop detection subsystem 611 may be configured to detect a network loop in response to the query OFDP packet being received by the same port used to egress the query OFDP packet.

In response to the detection of an undesirable network loop, the remediation subsystem 614 may transmit, via the notification subsystem 615, a notification to a user indicating the existence of an undesirable network loop and/or disable one or more port or connection of one or network switches within the network 600 via the network modification subsystem 616.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope and understanding of this disclosure should, therefore, be determined to encompass at least the following claims.

What is claimed:

1. A software-defined network (SDN) controller, comprising:
   a loop detection subsystem to:
      place a network flow on a first switch to forward any received open flow discovery protocol (OFDP) packets to the SDN controller, and
      cause the first switch to egress a query OFDP packet out of a first port of the first switch;
      detect that the first port on the first switch is attached to a network loop based on the query OFDP packet being ingressed by the first port of the first switch; and
      implement a remedial action in response to the detected network loop.

2. The SDN controller of claim 1, wherein the remedial action implemented by the loop detection subsystem comprises transmission of a notification indicating the existence of a network loop involving the first port on the first switch.

3. The SDN controller of claim 1, wherein the remedial action implemented by the loop detection subsystem comprises disabling the first port on the first switch.

4. The SDN controller of claim 1, wherein the query OFDP packet is caused to be egressed in response to a link-up event detected by the first port of the first switch.

5. The SDN controller of claim 1, wherein the query OFDP packet is caused to be egressed in response to the expiration of an automatically resetting timer, such that new query OFDP packets are periodically egressed.

6. The SDN controller of claim 1, wherein the query OFDP packet is caused to be egressed in response to a traffic monitoring subsystem detecting an increase in network traffic that exceeds a threshold level.

7. The SDN controller of claim 1, wherein the SDN controller is configured to disable the network flow on the first switch after commissioning, such that the first network flow is not implemented by the first switch in production.

8. The SDN controller of claim 1, wherein the SDN controller is configured to program the first switch to implement the functions of the loop detection subsystem after commissioning, such that loop detection continues to be implemented after the SDN controller is disconnected during production.

9. The SDN controller of claim 1, further comprising:
   an authentication subsystem to facilitate authentication of OFDP packets, including the query OFDP packet.

10. A system, comprising:
    a data network to convey data communications between computing devices;
    at least one switch, including a first switch; and
    a software-defined network (SDN) controller in communication with the network, the SDN controller including:
       an open flow discovery protocol (OFDP) packet generation subsystem to:
          generate a query OFDP packet for egress out of a first port of a first switch, and
          cause the first switch to egress the query OFDP packet out of the first port of the first switch;
       a loop detection subsystem to:
          place a network flow on the first switch to forward any OFDP packets to the SDN controller, and
          identify the first port on the first switch as being attached to a network loop in response to the query OFDP packet being received by the first port of the first switch; and
       a remediation subsystem including at least one of:
          a notification subsystem to transmit a notification to a user indicating the existence of a network loop involving the first port on the first switch, and
          a network modification subsystem to disable the first port on the first switch to break the network loop.

11. The system of claim 10, wherein the remediation subsystem comprises both the notification subsystem to transmit the notification and the network modification subsystem to disable the first port on the first network switch.

12. The system of claim 10, wherein the SDN controller further comprises:
    an authentication subsystem to facilitate authentication of OFDP packets, including the query OFDP packet; and wherein the first switch is programmed to authenticate received OFDP packets, including the query OFDP packet prior to egressing the query OFDP packet out of the first port.

13. The system of claim 12, wherein the authentication subsystem operates to add a cryptographic hash to all OFDP packets, including the query OFDP packet.

14. The system of claim 10, wherein the OFDP packet generation subsystem causes the query OFDP packet to be egressed in response to a link-up event detected on the first port of the first switch.

15. The system of claim 10, wherein the OFDP packet generation subsystem causes the query OFDP packet to be egressed in response to the expiration of a timer, such that new query OFDP packets are periodically egressed.

16. The system of claim 10, wherein the OFDP packet generation subsystem causes the query OFDP packet to be egressed in response to a traffic monitoring subsystem detecting an increase in network traffic that exceeds a threshold level.

17. The system of claim 10, wherein the loop detection subsystem places the network flow on the first switch to forward any OFDP packets to the SDN controller only during a network commissioning phase, and wherein the loop detection subsystem places a different flow on the first switch after commissioning to cause the first switch to ignore OFDP packets during a post-commissioning, production phase.

18. A method to detect and remediate a network loop, comprising:
instructing a first switch to forward any open flow discovery protocol (OFDP) packets to a software-defined network (SDN) controller;
generating a query OFDP packet for egress out of a first port of the first switch;
causing the first switch to egress the query OFDP packet out of the first port;
identifying the first port on the first switch as being attached to a network loop in response to the query OFDP packet being received by the first port of the first switch; and
disabling the first port on the first switch to break the network loop.

19. The method of claim 18, further comprising:
adding a cryptographic hash to the query OFDP packet to facilitate authentication by the first switch.

20. The method of claim 18, further comprising:
transmitting a notification to a user indicating the existence of the network loop involving the first port on the first switch.

21. The method of claim 18, further comprising:
disconnecting the SDN controller from the first switch after network commissioning is complete, such that network detection and port disabling are implemented only during network commissioning and not during normal operation.

* * * * *